(12) United States Patent
Young

(10) Patent No.: US 7,665,141 B2
(45) Date of Patent: Feb. 16, 2010

(54) ORIGIN AND CUSTODY OF COPIES FROM A STORED ELECTRONIC RECORD VERIFIED PAGE BY PAGE

(76) Inventor: Ghada Young, 6612 Via Siena, Rancho Palos Verdes, CA (US) 90275

( * ) Notice: Subject to any disclaimer, the term of this patent is extended or adjusted under 35 U.S.C. 154(b) by 759 days.

(21) Appl. No.: 10/998,306

(22) Filed: Nov. 24, 2004

(65) Prior Publication Data

US 2006/0112101 A1 May 25, 2006

(51) Int. Cl.
| | |
|---|---|
| G06F 7/04 | (2006.01) |
| G06F 17/30 | (2006.01) |
| H04N 7/16 | (2006.01) |
| H04L 9/32 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. .......................... 726/26; 713/176; 715/221; 715/230

(58) Field of Classification Search .................. 715/221, 715/230; 713/176; 726/26
See application file for complete search history.

(56) References Cited

U.S. PATENT DOCUMENTS 5,627,893 A    5/1997   Demytko (Continued)

OTHER PUBLICATIONS

EMSL's Electronic Laboratory Notebook Elena S. Mendoza, William T. Valdez, Wyllona M. Harris, Pavan Auman, Eric Gage, James D. Myers Environmental & Molecular Sciences Laboratory, Pacific Northwest National Laboratory, USA.*

(Continued)

*Primary Examiner*—Kambiz Zand
*Assistant Examiner*—Benjamin A Kaplan
(74) *Attorney, Agent, or Firm*—Bruce A. Jagger

(57) ABSTRACT

A method of authenticating a copy of a multi-page document, which includes digitizing a said multi-page document to generate one or more digitized files that together comprise a digitized transcript. A mark that is unique to the preparer of the document, such as a signature, is prepared and digitized. The preparer of the document is allowed to deposit the digitized transcript on an online repository. The operator of the online repository immediately establishes a verification process for the deposited digitized transcript. This verification process includes associating the digitized preparer mark with the deposited digitized transcript, and freezing the transcript, by encrypting it and deriving a checksum. The verification process also include associating a repository mark with the transcript. The operator of the online repository defines, under the direction of at least the preparer of the document, security rights to limit or otherwise control access to the deposited digitized transcript. The digitized preparer mark and the digitized repository mark are allowed to appear on substantially all copies of the pages of the document only if the pages have not been altered. If carrying out the verification process verifies that the deposited digitized transcript has not been changed since the verification process was established the marks are displayed with the unaltered page. This display whether the pages are displayed on a monitor or printed in paper form. Each page with this display is thus authenticated as to origin and custody apart from the other pages or the transcript as a whole.

9 Claims, 2 Drawing Sheets

U.S. PATENT DOCUMENTS

| | | | |
|---|---|---|---|
| 5,970,141 A * | 10/1999 | Bennett et al. | 704/270 |
| 6,091,835 A | 7/2000 | Smithies et al. | |
| 6,112,192 A | 8/2000 | Capek | |
| 6,253,223 B1 | 6/2001 | Sprunk | |
| 6,282,510 B1 * | 8/2001 | Bennett et al. | 704/235 |
| 6,463,468 B1 | 10/2002 | Buch et al. | |
| 6,487,538 B1 | 11/2002 | Gupta et al. | |
| 6,510,453 B1 * | 1/2003 | Apfel et al. | 709/206 |
| 6,522,769 B1 | 2/2003 | Rhoads et al. | |
| 2002/0073113 A1 * | 6/2002 | Caraher et al. | 707/500 |
| 2003/0187726 A1 | 10/2003 | Bull et al. | |
| 2004/0216039 A1 * | 10/2004 | Lane et al. | 715/511 |
| 2004/0220935 A1 * | 11/2004 | McGraw et al. | 707/10 |
| 2005/0108625 A1 * | 5/2005 | Bhogal et al. | 715/505 |
| 2006/0101328 A1 * | 5/2006 | Albornoz et al. | 715/512 |

OTHER PUBLICATIONS

E-Transcript Signatures, 2002, http://web.archive.org/20020118003449/http://www.reallegal.com.

RealLegal-e-transcript, 2003, http://www.reallegal.com/etranscript ATT.asp.

RealLegal-e-transcript, 2003, http://www.reallegal.com/etranscript_CR.asp.

* cited by examiner

ORIGIN AND CUSTODY OF COPIES FROM A STORED ELECTRONIC RECORD VERIFIED PAGE BY PAGE

BACKGROUND OF THE INVENTION

1. Field of the Invention

The invention relates in general to authenticated documents such as certified court reporter transcripts and, in particular, to a secure online repository that provides authentication in which substantially each separate substantive page is independently authenticated as to both origin and custody.

2. Description of the Prior Art

Court reporter transcripts have long been prepared in paper form and authenticated by the signatures of the court reporters on certificates at the end of the transcript. Sometimes the signatures of the witnesses, on original copies of the paper transcripts, also appear. Much of the process of preparing such transcripts has been automated and transcripts are generally available in electronic form. See, for example, Bennett et al. U.S. Pat. Nos. 5,970,141 and 6,282,510. Various symmetrical and, asymmetrical encryption schemes are widely used to authenticate electronic data. Digital signatures, for example, are widely used in electronic commerce to authenticate electronic information. Elaborate schemes for authenticating a person's electronic affirmation of a document have been proposed. See, for example, Smithies U.S. Pat. No. 6,091,835. Methods have been proposed for inserting electronic signatures (not digital signatures) or other pre-recorded data fragments into e-mail messages. See, for example, Apfel et al U.S. Pat. No. 6,510,453. It had been proposed to impose a court reporter's signature as a non-transferable watermark on the reporter's certificate, and to print it at the bottom of every page of the transcript. It had been proposed that internet service providers be allowed to insert images (typically, advertisements such as banner ads) into predefined spaces on web pages as they are viewed by end users. See, for example, Capek U.S. Pat. No. 6,112,192.

Court reporter transcripts are unique in the particular requirements that are imposed on them. They are typically a verbatim record of sworn testimony, and they must, above all else, be accurate and remain accurate. The Courts rely on them in dispensing justice, and legislatures rely on them in making laws. Attorneys rely on them in shaping the presentation of cases. For the most part they must remain confidential unless and until placed on the public record. Witnesses typically must have access to them for purposes of review and correction. In a given matter some witnesses may have access to some but not all transcripts, and some but not all parties may have access to any given transcript or exhibit or a portion thereof. Security rights need to be tailored to fit each unique situation. Everyone involved must be sure that all transcripts are accurate and that each individual transcript is handled according to the individual rules for security rights that apply to that transcript. Also, transcripts are seldom used in their entirety. They are generally excerpted. This complicates the authentication of the excerpts. All of these often competing requirements can be handled manually by knowledgeable experienced people. Automating the system has proven to be a substantial and not yet fully addressed challenge.

There is a problem with the authentication of court reporter transcripts that is generally unique to such transcripts. Official transcripts in paper form are typically bound so that the signature pages appear within the bindings. Thus, being bound with the signature pages authenticates the other pages in the official transcript. Usually, however, only a few pages of the transcript are needed for a particular purpose. When a few pages are copied from an official transcript, a separate oath, or the like, must be used to authenticate them. When only a few pages are reproduced from an electronic file of a transcript, authentication becomes a serious problem. An electronic file is subject to being altered, and such alteration, under certain circumstances, leaves no trace. Exhibits are typically attached to a transcript. Such exhibits, particularly when in digital form, are also subject to undetectable alteration, and require authentication. Physical exhibits are typically represented by images. When reduced to digital form, most exhibits appear in image file formats. The transcript itself generally, but not necessarily, appears in a text file format.

The use of online repositories for transcripts (and other documents) had been proposed. In general, such depositories are in the form of secure web sites. Transcripts are deposited on such web sites in digital form with access to the transcripts being controlled by a system of security rights. Such security rights typically include at least user names and passwords. Often, such online repositories are maintained by or for, and are open to only one entity, such as a law firm. That is, they are not available to the public. There is always some risk that a transcript or exhibit will be altered while on such online repositories. That is, the integrity of the custody of the transcript while it is on the online repository is a potential problem. Further, records, or portions thereof are typically downloaded by various users from online repositories, and reproduced for purposes of inclusion in briefs or the like. The integrity of the substantive pages that are so reproduced by users needs to be assured on a page by page basis both as to the origin and custody of the each page. Anyone who relies on the content of a particular substantive page needs to be assured that the page accurately reflects the event described therein, was not altered in any way while on the repository, and was not altered when reproduced by the user. For purposes of flexibility of use, the authentication needs to proceed page by page.

Those concerned with these problems recognize the need for an improved all electronic official record where each substantive page of the record, including pages that are images, pages that are text, mixed pages, and the like, are separately authenticated both as to creation and custody. This would permit each page to be reproduced and used separate and apart from the rest of the record with assurances that it is a true copy of the record.

These and other difficulties of the prior art have been overcome according to the present invention.

BRIEF SUMMARY OF THE INVENTION

A preferred embodiment according to the present invention involving a court reporter's transcript of a trial comprises in broad outline, the steps of preparing a multi-page official transcript, usually including paper exhibits, converting it to one or more electronic files that together comprise a digitized transcript, creating an digitized signature file that contains at least an image of the signature of the reporter that prepared the official transcript, depositing the digitized transcript in an online repository, providing a digitized mark of the repository that guarantees that the pages of the transcript have not been altered since it was placed on the repository, associating the digitized signature and the digitized mark with the digitized transcript in such a way that the image of the preparer's signature and the repository's mark appears on substantially each substantive page of the digitized transcript when displayed or printed, if, and only if, the substantive page is first authenticated when the file is opened. That is, the image and mark are allowed to appear only after the authentication is successfully completed. Thus, both the fidelity of each page as to being a true record of that page as originally recorded (origin), and as to being a true copy of what was originally deposited on the online repository (custody) is independently certified. Advances in technology have made it likely that some of the steps in this process will be different or may even be no longer necessary. Voice recognition technology, for example, permits the creation of an electronic file directly from speech. The role of the court reporter is changing, and may even be eliminated, at least in its present form. There will, however, always be a need for an accurate record of court and other proceedings that will require authentication. The present invention accommodates that need regardless of the details of the creation of that record.

The digitized transcript file and the digitized signature file are generally prepared by the original transcriber (originator) using a transcript generating software application provided by the operator of the repository. The application is preferably capable of combing text, images, and the like, into the digitized transcript file. A software application at the secure repository associates the digitized files in such a way that the image of the preparer's signature and the mark of the repository will appear on substantially each separate substantive page of any display or hardcopy of the authenticated digitized transcript if the page has not been altered. A software application operated by a user performs the necessary checks to assure that that the image and mark appear on a downloaded substantive page only if it has not been altered. Thus, each substantive page is authenticated as to its origin and custody all along the chain of its preparation and use.

A security protocol is imposed on the digitized electronic record by the repository. The security protocol permits individual ones of the substantive pages in the record to be reproduced at a location remote from the repository with custodian's and originator's marks displayed thereon only if the reproduced substantive pages have not been changed since the custodian's and originator's marks were associated with the digitized electronic record. A part of the security protocol is exercised by the repository's software at the user's location. The individual pages of the record can be separately reproduced by the user without causing the marks to be removed. If a page is altered by the user, the marks are removed.

The present invention finds application in a wide variety of situations beyond that of official judicial records. For example, some business meetings and transactions require complete and accurate permanent records of the events. Also, many legislative and executive proceedings require such complete records.

Other objects, advantages, and novel features of the present invention will become apparently from the following detailed description of the invention when considered in conjunction with the accompanying drawings.

BRIEF DESCRIPTION OF THE DRAWINGS

The present invention provides its benefits across a broad spectrum of digitizable records, including documents that comprise images and text, and documents that appear as images on a monitor or television screen, and the like. While the description which follows hereinafter is meant to be representative of a number of such applications, it is not exhaustive. As those skilled in the art will recognize, the basic apparatus taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation.

DETAILED DESCRIPTION OF THE PREFERRED EMBODIMENTS

The present invention provides its benefits across a broad spectrum of endeavors where authentication of individual parts of a document is required. It is applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention, the invention being measured by the appended claims and not by the details of the specification.

Figure 1:
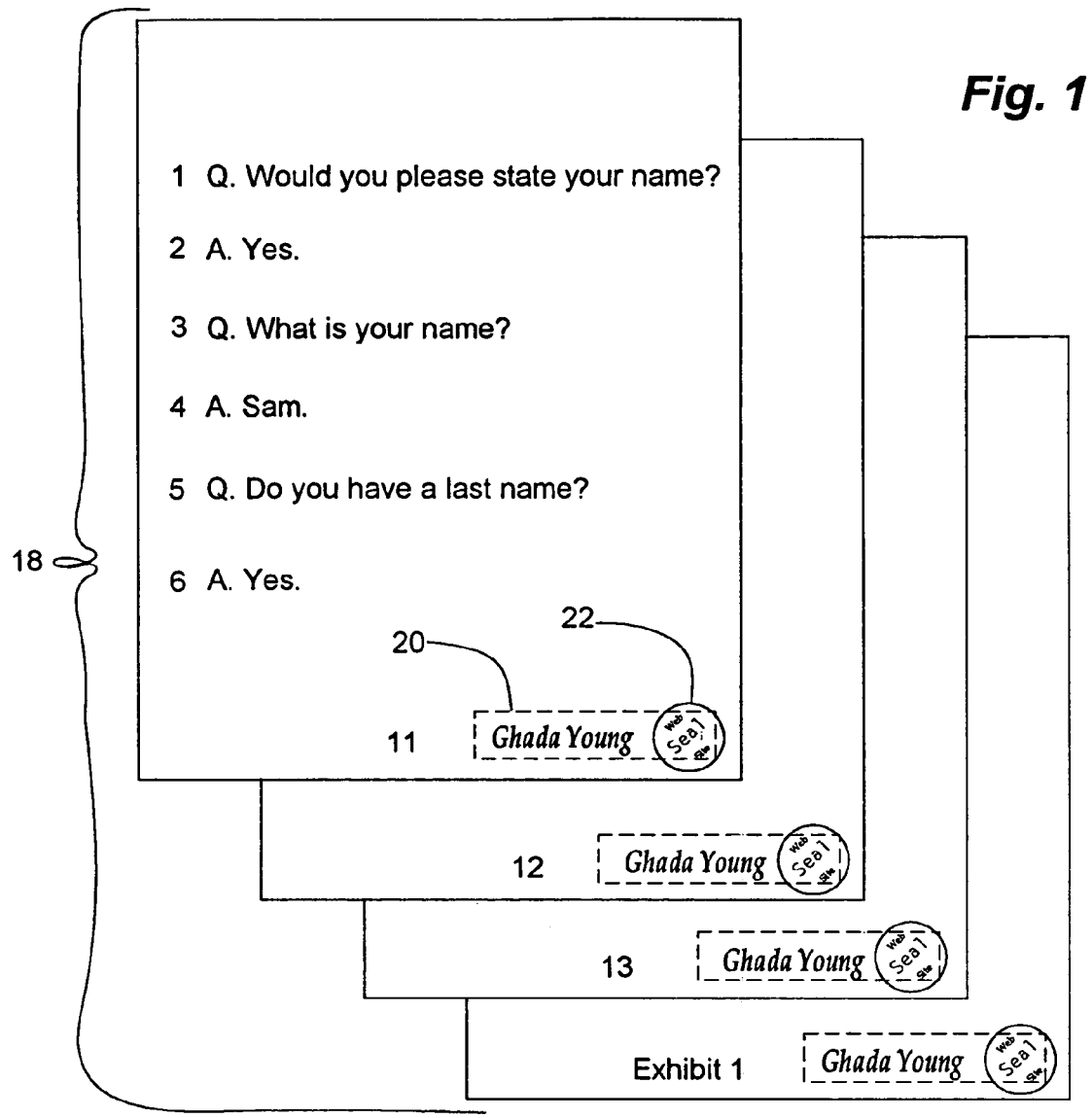
FIG. 1 is a diagrammatic view of a Court Reporter's transcript prepared according to the present invention.
Figure 2:
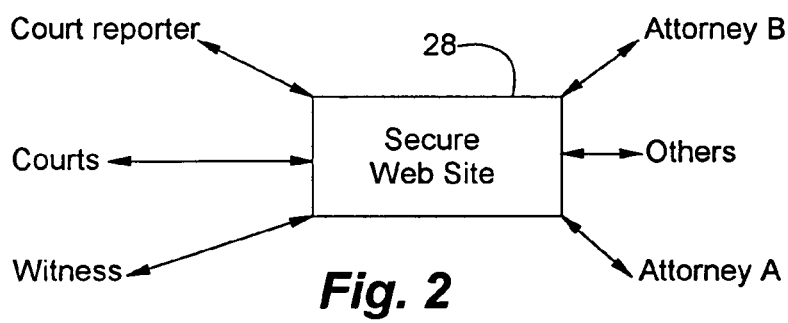
FIG. 2 is a diagrammatic representation of the different entities and their relationships that are engaged in the practice of the present invention.
Figure 3:
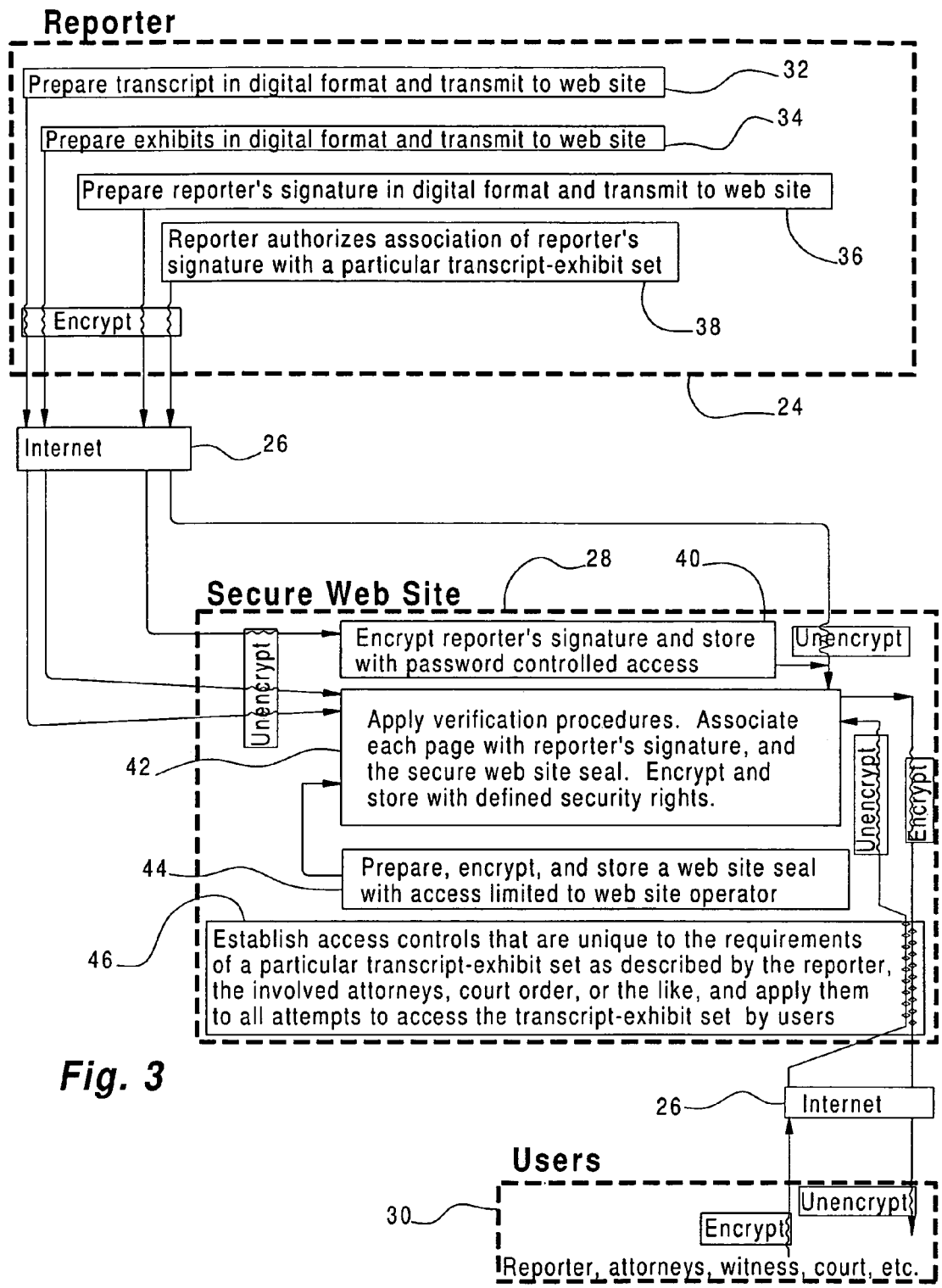
FIG. 3 is a diagrammatic representation of the flow of data, the access, and the various functions performed by the originating court reporter, the secure web site that acts as the online repository for transcripts, and the various users of the transcripts.

With particular reference to the accompanying drawings of the embodiment chosen for illustration, there is diagrammatically illustrated at 18 (FIG. 1), pages 11 through 13 of a court reporter's transcript, and an image of Exhibit 1. These reside on a secure web site 28 (FIGS. 2 and 3) in electronic form where they are available for access by authorized persons 30. Each substantive page of the electronic transcript on the secure web site 28 incorporates an image 20 of the responsible court reporter's signature or other mark, and an image 22 of the seal of the secure web site. By tradition, the mark is an image of the court reporter's signature, but it can be any mark that serves the purpose of authentication. As used herein, unless otherwise indicated, "signature" includes all such marks. Also, the authenticating entity may not be a court reporter in the traditional sense of that term. For example, someone who attended a proceeding and then views or listens to a video and/or audio recording of a proceeding may certify that the digitized record deposited on the secure repository is a true copy of the proceeding. The terms "court reporter" and "reporter", unless otherwise indicated, is used broadly to include all such authenticating entities. Thus, the image 20 of the reporter's signature vouches for the integrity of each page of the transcript 18 at the time that reporter 24 submitted the digitized record to a secure repository, which is typically, but not necessarily, a secure web site 28. The term "page" as used herein is intended to be inclusive of all subdivisions of the record whether in the form of conventional paper pages or otherwise and without regard to the form in which it is originally created, stored or reproduced. The term "secure web site" as used herein is intended to encompass all secure online repositories. The seal 22 of the secure web site 28 vouches that the pages of the transcript 18 on which it appears have not been altered since the reporter 24 submitted them to the secure web site 28. Any corrections to the transcript 18 made by a witness appear separately from the transcript as filed with the secure web site 28. These changes are associated with the transcript 18 on the secure web site 28. Depending on the desires of the users 30, such changes may or may not appear separately from or in association with the specific pages to which they apply. Preferably the electronic files prepared or involved in the various steps are digitized, although other forms of electronic files, such as, for example, analog files are contemplated within the teachings of the present invention.

A secure web site 28 acts, for example, as an online repository for textual transcripts and associated exhibit images and witness corrections (or other submissions in electronic form). The services of this web site are available to any member of the public that complies with the rules and regulations that are established and imposed by the operator of the secure web site 28. Typically, the operator of the secure repository charges a fee and registers a reporter to make submissions to the repository. A fee is charged for each record that is submitted. There may or may not be a charge for the use of specialized software. Users may or may not be charged for accessing records.

Secure web site 28 is optimally configured for the needs of court reporters. A reporter 24 takes down verbatim testimony and then prepares a transcript in digital format and transmits it to a secure web site 28 as indicated at step 32. If there are any exhibits associated with the transcript, the reporter also carries out the step 34 of preparing those in digital format (typically, images) and also transmits them to the secure web site 28. The transcript and exhibits (the record) may or may not be in the same file depending on the desires of the court reporter and the other users, and the capabilities of the software that is used.

The submitting court reporter (or other submitter) prepares a signature or other unique mark or identifier (signature, fingerprint, graphic, random number-letter combination, or the like) that identifies the transmitter, and transmits it in digital format (typical an image) to the secure web site in step 36. Unless a different unique identifier or other mark is required for a particular transcript or other submission, this step 36 need be carried out only once by a given submitter. The secure web site 28 encrypts and stores the submitter's unique mark as indicated at step 40. The operator of the secure web site 28 only associates the submitter's unique mark 20 with a submission (record) at the direction of the submitter. The submitter controls whether the submitter's unique mark is associated with a particular submission.

When a submitter (reporter) has transmitted a submission (record) to an online repository on a secure web site 28, and wishes to associate that submitter's unique mark with that submission, the submitter so authorizes such association in an electronic submission 38 to the web site. Authorization step 38 can be accomplished simultaneously with transmittal steps 32 and 34, as a part of steps 32 and 34, or separately at some other time as may be desired.

When corrections are made to a submission that has already been filed, the corrections are generally made on separate pages that are submitted separately. Such pages of corrections are typically associated with the original submission and subjected to the same authentication or verification procedures as the original submission. The integrity of the corrections is thus assured in the same way and to the same extent as the original submission. Any other separately submitted submissions are preferably likewise associated With the original submission and subjected to the same or similar security procedures.

When the secure web site 28 receives a submission, that submission is immediately subjected to authentication or verification procedures in step 42 so that the content of the submission is "frozen" in the sense that any subsequent changes are detectable. The operator of the secure web site is thus capable of verifying or authenticating electronic or paper copies of the submission or any page thereof as to their being a true copy of the original submission. Such security procedures preferably include at least deriving an integrity checksum or creating some other integrity assurance system. The integrity of the custody of the record on the secure repository is thus established.

The web site seal 22 or other unique mark on a page attests to the fact that the page is a true copy of the submission at the time the record was submitted to the online repository. The submitter's unique mark 20 on a page attests to the fact that the page is a true copy of the page that the submitter prepared or can otherwise vouch for, and is also a true record of the acts or events that are reflected in the record. Depending on when the submitter's unique mark is applied to the submission (concurrently with or sometime after the submission), the submitter's mark 20 may attest to all such facts. If the unique mark 20 is applied concurrently with the submission to the secure web site, it can logically serve all three functions. If some time lapses between the submission and the association of the submitter's unique mark with the submission, then the submitter can not attest that a page is a true copy of what was submitted. The page might have been altered while on the online repository during the time between the original submission and the later association of the unique mark with the submission. Also, since the application of the submitter's unique mark to the submission on the secure web site is out of the submitter's control, there may be an opportunity for the alteration of the submission by the web site operator. The seal of the web site operator attests that this has not occurred.

The web site seal 22 is created by the web site operator at 44. This seal is applied by the web site operator to all submissions when they are received at the secure web site 28. Preferably, such application of seal 22 to all submissions is automatic and unavoidable. Thus, no human discretion can interfere with the integrity of the system. The web site operator can create separate seals for different kinds of submissions or even for each submission, if desired, but this is generally unnecessary.

Various users 30 may need access to various submissions for various purposes. Individualized security rights are provided for each user. A submitter 24 may need to review the entirety of a particular submission. A witness may need to review the entirety a submission for purposes of refreshing memory or correction. Various participants in a legal proceeding may have a need to access all or part of a particular submission for evidentiary purposes. The general public or the media may have some informational interest in some or all of a submission. Some part or all of a particular submission may be restricted as to the persons, entities, or classes of persons who may be permitted access to it. The original submitter or some other person with the authority to control access to a submission informs the secure web site operator as to the access controls that are to be applied to a particular submission. The web site operator establishes those controls at 46 and administers the application of those access controls to requests from user 30 to be granted access to the submission. The access controls are very flexible and can be individually tailored to accommodate the specific requirements for each submission on the secure web site 28. Typically, passwords, identifications, and the like are employed.

Strong security measures are taken to prevent unauthorized intruders from gaining unauthorized access to any submission. The web site or repository itself is protected, and preferably the records on the web site are also protected by individual encryption or otherwise. Strong encryption is typically employed with all submissions so an intruder that penetrates into the secure web site 28 can not discover the content of any submission on the web site.

The present invention provides a method of individually authenticating a copy of each page of a multi-page record. The digitized preparer mark and the digitized repository mark, are allowed to appear on most if not all copies of the pages of the document only if the pages have not been altered. If carrying out the verification process verifies that the deposited digitized transcript (or page thereof) has not been changed since the verification process was established the mark(s) is (are) displayed. This display is permitted on substantially all substantive pages whether the pages are displayed on a monitor or printed in paper form. Each page with this display is thus authenticated apart from the other pages or the transcript as a whole. There may be some parts of a given record for which authentication is not necessary. Flexibility can be provided to permit these parts to go unauthenticated, if desired. Preferably, all of the pages are treated the same so that there is no opportunity for error.

Typically, a reporter's signature or other mark is digitized and transmitted to secure online repository, step 36, where it is stored, step 40, for future use. This generally occurs when a reporter arranges with the repository operator (for example, by subscription) to use the secure online repository 28 that is offered by the operator. At some later time the reporter prepares or otherwise obtains a digitized record. Typically, but not necessarily, the reporter carries out the submission of the record to the online repository, steps 32 and 34, along with the submission of an authorization for the repository to apply the reporter's mark to the digitized record, step 38. Immediately upon receipt of the record the repository operator applies the mark of the repository to the record. Typically, but not necessarily, the reporter also transmits instructions as to how the record is to be accessed by users 30. The operator of the secure repository immediately imposes the required security protocols on the record. Preferably, the default security restriction is that no one, including the reporter and the repository operator, has access to the record until affirmative action is taken to define and impose customized access rights on the record.

Preferably, any changes made to the electronic record after it is placed on the online secure repository are made by way of additions, each of which is authenticated in the same way that the original was authenticated. If it is desired to make changes in the previously deposited electronic record, provisions can be made by the operator of the secure repository to accomplish such changes. The resulting altered record would preferably be treated as a new record different from the original record. The altered record would be authenticated in its own right. Depending on the circumstances, the original record might or might not remain on the repository. Preferably, the authentication procedures would prevent the alteration of the original record, even with the concurrence of all those involved, while still retaining the original unique marks of the repository and the reporter on each of the substantive pages.

An important aspect of the page by page origin and custody authentication provided according to the present invention is that a user 30 can download and reproduce one or more substantive pages of a record from the repository, and, so long as that page is not altered, each such page will retain both the unique reporter and repository marks. Preferably, if a user 30 downloads two substantive pages and alters one of them, when reproduced the altered page will not bear the unique markings, but the unaltered page will. The user must employ software that is compatible with the authentication procedures imposed by the repository. Typically, the repository operator provides this software. If a user 30 in working with substantive pages uses unauthorized software, the unique markings will not appear on the substantive pages when they are reproduced, because the integrity of the pages can not be assured. This is true even if no alterations are made to the pages.

The present invention is applied unit by unit to a stored record, preferably as it is in the process of being stored. Typically, but not necessarily, a unit corresponds to a conventional printed page. According to the present invention, a page bearing substantive information can be stored in a repository. That page, at some later time, can be retrieved from the repository and reproduced by display on a monitor, printing on paper, or the like. As reproduced from the stored page, the page will bear not only the substantive information, but it will also bear both an originator mark and a custodian mark. The originator mark certifies that the substantive information was an accurate record of some act, scene, event or transaction when the substantive information was first recorded (digitally or otherwise). The custodian mark certifies that the substantive information was not changed while stored in the repository and during its reproduction. These two marks are preferably associated with the page as it is placed in storage on the repository by an established security protocol.

The established security protocol that is imposed by the operator preferably combines the originator mark and the custodian mark (components) into one composite mark. This combination preferably occurs automatically as the record is received from the originator before there is any possibility of any deliberate or accidental change to occur to the record. The combined mark is immediately applied to the record. At the same time, the security protocol preferably imposes an encryption scheme on the record. Any subsequent alteration of a page of the record will prevent the combined mark from appearing in association with reproductions of that page of the record. Preferably, the combined mark will still appear on reproductions of other unaltered pages of the record.

Under some circumstances it may be desirable to certify less than an entire page of a record. If desired, part of a page can be certified so the marks will appear thereon. Although it is less preferred, it may be desirable to certify only one of origin or custody. For example, for some circumstances it may be unnecessary to certify the origin of the information on a page. The integrity of the custody of the record may be the only issue of concern. In this circumstance, only the mark of the custodian would be necessary. In other circumstances, only the certificate of the originator would be of interest so that only the originator's mark would need to appear on a reproduced page. Provisions can be made, if desired, to show only one of the components of the composite mark on a reproduced page.

A number of strong encryption schemes are available for use according to the present invention. According to a preferred embodiment, the transcript is encrypted and a checksum is calculated. The checksum is intended to be used to authenticate the transcript. A digitized signature file is prepared. The signature file includes a unique image of the preparer's signature and preferably designates the particular software program used to perform the method. The digitized signature file is encrypted and associated with the transcript in such a way that the signature appears on each page of the transcript so long as the checksum for the transcript matches the original checksum. The transcript is transmitted electronically from the online repository to an intended user when the imposed security rights have been exercised. For purposes of transmission over the internet, conventional public key encryption techniques are used. For example, a secret secession key is established between the repository and a particular user. The encrypted signature file and the transcript are then encrypted, transmitted electronically to the intended user, and decrypted. The checksum of the decrypted file is automatically computed and compared with that of the original, and the signature is allowed to appear on each page of the decrypted file in both the electronic and paper forms. Each time the transcript is opened, and each time any part of the transcript is printed in paper form, the checksum is recalculated and compared. If the checksum comparison fails, the signature does not appear. If desired, one or more other or more secure encryption methods may be substituted for the checksum method to authenticate the transcript.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A method of separately authenticating the origin and custody of substantially each substantive page reproduced from a plurality of stored digitized electronic records created by a plurality of different originators, said method comprising:
    creating and storing said plurality of digitized electronic records;
    applying a custodian mark to each of said digitized electronic records when said digitized electronic records are placed in storage;
    applying an originator mark to each of said digitized electronic records after it has been created, wherein the same originator mark is applied to each of said digitized electronic records that is created by the same originator;
    reproducing at least one said substantive page from at least one of said stored digitized electronic records, the resulting reproduced substantive page being in digitized form; and
    wherein both said custodian and originator marks appear on said reproduced substantive page only if such reproduced substantive page has not been changed since said custodian and originator marks were applied to said digitized electronic record, said reproduced substantive page being alterable to produce an altered page from which said custodian and originator marks have been automatically and unavoidably removed by the alteration of said reproduced substantive page.

2. A method according to claim 1 including calculating a checksum for each said stored digitized electronic record.

3. A method according to claim 1 including displaying at least one said reproduced substantive page on a monitor screen with both a said reporter originator mark and said repository custodian mark appearing on said at least one reproduced substantive page.

4. A method according to claim 1 including printing at least one said reproduced substantive page of a said electronic record on a piece of paper with both a said reporter originator mark and said repository custodian mark appearing on said one reproduced substantive page.

5. A method of claim 1 wherein said at least one originator determines whether said originator mark is to be applied to a particular said stored digitized electronic record, and instructs said custodian as to what access controls to apply to said particular stored digitized electronic record, said access controls including at least who shall have access to read or change said particular stored digitized electronic record.

6. A method of separately authenticating the origin and custody of substantially each substantive page reproduced from stored digitized electronic records, said method comprising:
    creating and storing said digitized electronic records, said stored digitized electronic records being stored under the custody and control of a custodian, and said stored digitized electronic records being created by at least one originator;
    applying both a custodian mark and an originator mark to at least a said stored digitized electronic record to produce a marked digitized record, said originator mark on said marked digitized record being unique to a single said originator, and said custodian mark on said marked digitized record being unique to said custodian;
    reproducing at least one unaltered said substantive page from said marked digitized record, said reproducing being by a user that is not under the control of either said custodian or said originator, the resulting unaltered substantive page being in digitized form with said custodian and originator marks appearing thereon; and
    altering said unaltered substantive page, wherein said altering causes the creation of an altered page from which said originator and custodian marks have been removed.

7. A method of separately authenticating the origin and custody of substantially each substantive page reproduced from stored digitized electronic records, said method comprising:
    creating and storing at least two said stored digitized electronic records, each of which was created by a different originator, said stored digitized electronic records being stored under the custody and control of a custodian, and each of said stored digitized electric records bearing a custodian mark that is unique to said custodian and an originator mark that is unique to its originator
    reproducing at least one unaltered said substantive page from each of said stored digitized electronic records to create at least a first marked digitized record from a first of said two stored digitized electronic records and a second marked digitized record from a second of said two stored digitized electronic records, said reproducing being by first and second users, respectively, said first and second users not being under the control of said custodian or any of said originators, the resulting unaltered substantive pages being in digitized form with said custodian and respective originator marks appearing thereon; and
    altering said unaltered substantive pages, wherein said altering causes the creation of altered pages from which said respective originator and custodian marks have been removed.

8. A method according to claim 7 including establishing different access rights to a said electronic record for different users.

9. A method according to claim 7 including establishing access rights to a said stored digitized electronic record, said establishing including restricting access to a portion of such stored digitized electronic record for said first user and not said second user.

* * * * *

UNITED STATES PATENT AND TRADEMARK OFFICE
CERTIFICATE OF CORRECTION

| | | |
|---|---|---|
| PATENT NO. | : 7,665,141 B2 | Page 1 of 1 |
| APPLICATION NO. | : 10/998306 | |
| DATED | : February 16, 2010 | |
| INVENTOR(S) | : Ghada Young | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1256 days.

Signed and Sealed this

Fourth Day of January, 2011

David J. Kappos
*Director of the United States Patent and Trademark Office*